(12) United States Patent
Oshima et al.

(10) Patent No.: US 8,962,538 B2
(45) Date of Patent: Feb. 24, 2015

(54) DI FORMING WATER-BASED COLLANT OF LAMINATED METAL SHEET AND METHOD FOR DI FORMING LAMINATED METAL SHEET

(75) Inventors: Yasuhide Oshima, Tokyo (JP); Masaki Tada, Tokyo (JP); Hiroki Iwasa, Tokyo (JP); Katsumi Kojima, Tokyo (JP); Junichi Kitagawa, Tokyo (JP); Yoshihiko Yasue, Tokyo (JP); Toshikazu Ikeda, Osaka (JP); Tomohiro Kanokogi, Osaka (JP); Takeyoshi Fukuda, Osaka (JP)

(73) Assignees: JFE Steel Corporation (JP); Nippon Quaker Chemical, Ltd. (JP)

( * ) Notice: Subject to any disclaimer, the term of this patent is extended or adjusted under 35 U.S.C. 154(b) by 145 days.

(21) Appl. No.: 12/993,943

(22) PCT Filed: May 26, 2009

(86) PCT No.: PCT/JP2009/059937
§ 371 (c)(1),
(2), (4) Date: Nov. 22, 2010

(87) PCT Pub. No.: WO2009/145338
PCT Pub. Date: Dec. 3, 2009

(65) Prior Publication Data
US 2011/0067798 A1     Mar. 24, 2011

(30) Foreign Application Priority Data

May 27, 2008 (JP) .................... 2008-138741

(51) Int. Cl.
*C10M 173/02*     (2006.01)
*C09K 5/10*       (2006.01)
*B21D 22/20*      (2006.01)

(52) U.S. Cl.
CPC ............. *C09K 5/10* (2013.01); *B21D 22/201* (2013.01); *C10M 173/02* (2013.01); *C10M 2201/062* (2013.01); *C10M 2207/125* (2013.01); *C10M 2215/042* (2013.01); *C10N 2220/142* (2013.01); *C10N 2230/12* (2013.01); *C10N 2230/62* (2013.01); *C10N 2240/402* (2013.01)
USPC ........... 508/110; 508/154; 508/178; 508/179; 508/459; 508/527; 508/545

(58) Field of Classification Search
USPC ......... 508/178, 459, 548, 110, 154, 179, 527, 508/545
See application file for complete search history.

(56) References Cited

U.S. PATENT DOCUMENTS

| | | | |
|---|---|---|---|
| 3,750,847 A * | 8/1973 | Sluhan .................. | 184/109 |
| 2006/0240996 A1 | 10/2006 | Hayashi et al. | |
| 2007/0298983 A1 * | 12/2007 | Theunissen et al. ......... | 508/264 |
| 2009/0170736 A1 * | 7/2009 | Brutto et al. ............... | 508/449 |

FOREIGN PATENT DOCUMENTS

| | | | |
|---|---|---|---|
| JP | 56-081397 A | | 7/1981 |
| JP | 59-166595 A | | 9/1984 |
| JP | 9-271869 A | | 10/1997 |
| JP | 9-285826 A | | 11/1997 |
| JP | 9-285827 A | | 11/1997 |
| JP | 10-085872 A | | 4/1998 |
| JP | 10-088176 A | | 4/1998 |
| JP | 10085872 A | * | 4/1998 |
| JP | 2002-080882 A | | 3/2002 |
| JP | 2003-089797 A | | 3/2003 |
| JP | 2004-051870 A | | 2/2004 |
| TW | 388726 | | 5/2000 |
| WO | 2004/069968 A1 | | 8/2004 |
| WO | WO 2007130836 A1 | * | 11/2007 |

* cited by examiner

*Primary Examiner* — Taiwo Oladapo
(74) *Attorney, Agent, or Firm* — DLA Piper LLP (US)

(57) ABSTRACT

A DI forming water-based coolant of a laminated metal sheet includes at least one kind of base (a) selected from alkanolamines and alkali metal hydroxides, a fatty acid (b), and water (c), wherein the total content of the base (a) and the fatty acid (b) is 0.02 to 4% by mass and the ratio of a straight-chain fatty acid having a carbon number of 6 to 12 in the fatty acid (b) is 80 to 100% by mass.

18 Claims, No Drawings

DI FORMING WATER-BASED COLLANT OF LAMINATED METAL SHEET AND METHOD FOR DI FORMING LAMINATED METAL SHEET

RELATED APPLICATIONS

This is a §371 of International Application No. PCT/JP2009/059937, with an international filing date of May 26, 2009 (WO 2009/145338 A1, published Dec. 3, 2009), which is based on Japanese Patent Application No. 2008-138741, filed May 27, 2008, the subject matter of which is incorporated by reference.

TECHNICAL FIELD

This disclosure relates to a DI forming water-based coolant (lubricating/cooling agent) of a laminated metal sheet, a method for DI forming a laminated metal sheet and a method for manufacturing a laminated DI-formed body that uses the water-based coolant.

BACKGROUND

A DI can is one of two-piece cans that do not have a seam between its body and bottom. The DI can is obtained by ironing or redrawing/ironing a drawn can that is prepared by drawing a metal sheet. The DI can is widely used as a container for beverages such as beers and soft drinks and for foods such as soups and vegetables.

The drawing herein is a method in which a metal sheet punched into a disc is fixed using a blank holder and then formed into a cup with its bottom using a tool constituted by punches and dies in a drawing apparatus called a cupping press. The ironing is a method for thinly stretching the side wall of a formed body (cup) obtained by drawing or redrawing. A DI forming means a combination between drawing and ironing or between drawing and redrawing/ironing.

When the diameter of a metal sheet punched into a disc is much larger than that of a punch in the drawing, it may be difficult to obtain a cup having a desired shape in a single drawing. In that case, the cup is generally formed into a desired shape in a two-step drawing (drawing-redrawing). In that step, a cup having a relatively large diameter is manufactured using a drawing apparatus called a cupping press. Subsequently, redrawing is performed and ironing is then performed using a can body forming apparatus called a body maker.

Metal sheets such as a tinned steel sheet or an aluminum sheet have been commonly used as a material of a metal sheet for DI cans. After such metal sheets are DI formed into a desired shape, aftertreatments such as cleaning, surface treatment, and coating are performed to obtain a product (DI can). However, a method for manufacturing a container product (DI can) by DI forming polyester film (hereinafter may be simply referred to as "film") laminated metal sheet (laminated metal sheet) has been considered recently to omit or simplify the aftertreatments such as cleaning, surface treatment, and coating.

DI forming methods are totally different between the case where a film laminated metal sheet is DI formed and the case where an existing metal sheet is used as a material.

As described in Japanese Unexamined Patent Application Publication No. 9-271869, an emulsion coolant is commonly used in the manufacturing of DI cans that uses an existing metal sheet as a material. Since oil is dispersed in water in this emulsion coolant, a chemical agent needs to be used for cleaning the oil left on a can surface. This easily causes damage to a film, and thus the existing emulsion coolant is unsuitable for DI forming of a laminated metal sheet.

In recent years, a water-based coolant that is excellent in ease of cleaning has been developed and commonly used as shown in Japanese Unexamined Patent Application Publication Nos. 10-85872 and 10-88176. Since the water-based coolant is utilized for DI forming that uses a metal sheet as a material, its viscosity is increased with an ester of a trihydric alcohol and a fatty acid having a carbon number of 18 (JP '872) or a polyoxyalkylene (JP '176) to improve formability by reducing friction between a metal surface and a forming tool.

However, when such a water-based coolant is utilized for DI forming that uses a laminated metal sheet as a material, there are various problems in that such a water-based coolant shows insufficient DI formability, easily causes damage to a film, and provides low food safety level of DI cans. Thus, such a water-based coolant cannot be utilized for the DI forming.

Furthermore, when a water-based coolant is used, there is a problem in that rust is easily caused on the surface of a forming apparatus for DI forming.

A method for DI forming a laminated metal sheet is totally different from a method for DI forming an existing metal sheet because the surface of a metal sheet is coated with a laminate film. In other words, the surface of the laminate film is softer than that of a metal and also has lubricity. Thus, if a high viscosity coolant containing polymers that is utilized for DI forming of an existing metal sheet is used, the DI formability is decreased.

A polyester film used for a laminated metal sheet is slightly inferior in durability against a higher fatty acid having a large number of carbon atoms. Adhesion of the polyester film to a base material decreases and the film is damaged in contact with such fatty acid having a large number of carbon atoms. In addition, the food safety level of the existing coolant itself is low because the existing coolant is used on the assumption that it is completely removed in an aftertreatment such as a cleaning step after DI forming.

Accordingly, it could be helpful to provide a DI forming water-based coolant of a laminated metal sheet that achieves excellent DI formability during DI forming of the laminated metal sheet, and satisfies the following characteristics: (i) damage is not caused to a lamination film (particularly polyester film) of the laminated metal sheet; (ii) cleaning is easily performed and a DI can with high food safety level can be obtained even if a cleaning step of DI formed parts is simplified; and (iii) rust is not easily caused on the surface of a forming apparatus in spite of a water-based coolant.

It could also be helpful to provide a method for DI forming a laminated metal sheet and a method for manufacturing a laminated DI-formed body that use such a water-based coolant.

SUMMARY

We found that, by preparing a low viscosity water-based solution that does not contain a polymer component used for an existing DI forming coolant of a metal sheet, but contains a fatty acid component having a small number of carbon atoms and by adding multiple certain bases to the fatty acid, excellent DI formability during the DI forming of a laminated metal sheet is achieved and a DI forming coolant of a laminated metal sheet having the characteristics (i) to (iii) described above is further obtained.

We thus provide:

[1] A DI forming water-based coolant of a laminated metal sheet includes at least one kind of base (a) selected from alkanolamines and alkali metal hydroxides, a fatty acid (b), and water (c), wherein a total content of the base (a) and the fatty acid (b) is 0.02 to 4% by mass and a ratio of a straight-chain fatty acid having a carbon number of 6 to 12 in the fatty acid (b) is 80 to 100% by mass.

[2] In the DI forming water-based coolant of a laminated metal sheet of [1], a molar ratio of base (a)/fatty acid (b) is 0.2 to 3.0 while a molar ratio of alkanolamine/fatty acid (b) is 0 to 3.0 and a molar ratio of alkali metal hydroxide/fatty acid (b) is 0 to 1.8.

[3] In the DI forming water-based coolant of a laminated metal sheet of [1] or [2], pH at 40° C. is 7.3 to 11.5.

[4] In the DI forming water-based coolant of a laminated metal sheet of any one of [1] to [3], the fatty acid (b) is at least one kind selected from caproic acid, caprylic acid, capric acid, and lauric acid.

[5] In the DI forming water-based coolant of a laminated metal sheet of any one of [1] to [4], an alkanolamine is contained as at least part of the base (a), and the alkanolamine is at least one kind selected from monoethanolamine and triethanolamine.

[6] In the DI forming water-based coolant of a laminated metal sheet of any one of [1] to [5], an alkali metal hydroxide is contained as at least part of the base (a), and the alkali metal hydroxide is at least one kind selected from sodium hydroxide and potassium hydroxide.

[7] In a method for DI forming a laminated metal sheet, the water-based coolant of any one of [1] to [6] is used.

[8] In the method for DI forming a laminated metal sheet of [7], a metal sheet constituting the laminated metal sheet is a chromium steel sheet or a tinned steel sheet.

[9] In a method for manufacturing a laminated DI-formed body by DI forming a laminated metal sheet, the water-based coolant of any one of [1] to [6] is used.

[10] In the method for manufacturing a laminated DI-formed body of [9], a metal sheet constituting the laminated metal sheet is a chromium steel sheet or a tinned steel sheet.

DETAILED DESCRIPTION

A DI forming water-based coolant of a laminated metal sheet achieves excellent DI formability during DI forming of a laminated metal sheet and has the following characteristics: (i) damage is not caused to a lamination film (particularly polyester film) of the laminated metal sheet; (ii) cleaning is easily performed and a DI can with high food safety level can be obtained even if a cleaning step of DI formed parts is simplified; and (iii) rust is not easily caused on the surface of a forming apparatus in spite of a water-based coolant. According to our method for DI forming a laminated metal sheet and our method for manufacturing a laminated DI-formed body that uses such a water-based coolant, DI forming of a laminated metal sheet can be suitably performed and a laminated DI-formed body (e.g., laminated DI can) with good quality, food safety, and durability can be obtained. Since a cleaning step after forming is simplified, productivity is significantly improved.

A DI forming water-based coolant of a laminated metal sheet includes at least one kind of base (a) selected from alkanolamines and alkali metal hydroxides, a fatty acid (b), and water (c), wherein the total content of the base (a) and the fatty acid (b) is 0.02 to 4% by mass and the ratio of a straight-chain fatty acid having a carbon number of 6 to 12 in the fatty acid (b) is 80 to 100% by mass.

The base (a) is composed of at least one kind of base selected from alkanolamines and alkali metal hydroxides.

Examples of the alkanolamines include saturated aliphatic amines having a hydroxyl group in its molecule. Alkanolamines having a carbon number of 1 to 12 are preferably used, but the alkanolamines are not particularly limited to the alkanolamines having a carbon number of 1 to 12. Examples of the alkanolamines having a carbon number of 1 to 12 include monomethanolamine, dimethanolamine, trimethanolamine, N-ethylmethanolamine, N-propylmethanolamine, N-n-butylmethanolamine, N-tert-butylmethanolamine, N,N-diethylmethanolamine, N,N-dipropylmethanolamine, N,N-di-n-butylmethanolamine, N,N-di-tert-butylmethanolamine, monoethanolamine, diethanolamine, triethanolamine, N-propylethanolamine, N-n-butylethanolamine, N-tert-butylethanolamine, N,N-dimethylethanolamine, N,N-dipropylethanolamine, N,N-di-n-butylethanolamine, N,N-di-tert-butylethanolamine, monopropanolamine, dipropanolamine, tripropanolamine, N-methylpropanolamine, N-ethylpropanolamine, N-n-butylpropanolamine, N-tert-butylpropanolamine, N,N-dimethylpropanolamine, N,N-diethylpropanolamine, N,N-di-n-butylpropanolamine, and N,N-di-tert-butylpropanolamine.

In consideration of solution stability of a water-based coolant, ease of cleaning after DI forming, suppression of damage to a lamination film (particularly a polyester film, hereinafter the same), and the like, more preferable alkanolamines are trimethanolamine, monoethanolamine, diethanolamine, triethanolamine, and monopropanolamine. In consideration of ease of cleaning after DI forming, suppression of damage to a lamination film, and food safety, the most preferable alkanolamine is monoethanolamine or triethanolamine.

One or more kinds of the alkanolamines can be used.

Examples of the alkali metal hydroxides include lithium hydroxide, sodium hydroxide, potassium hydroxide, rubidium hydroxide, cesium hydroxide, and francium hydroxide. In consideration of solution stability of a water-based coolant, ease of cleaning after DI forming, suppression of damage to a lamination film, and food safety, the most preferable alkali metal hydroxide is sodium hydroxide or potassium hydroxide.

One or more kinds of the alkali metal hydroxides can be used.

Examples of the fatty acid (b) include aliphatic monocarboxylic acids. A fatty acid having a carbon number of 2 to 34 is preferably used, but the fatty acid is not particularly limited to the fatty acid having a carbon number of 2 to 34. Examples of the fatty acid having a carbon number of 2 to 34 include butyric acid, valeric acid, caproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic acid, behenic acid, lignoceric acid, cerotic acid, montanic acid, melissic acid, linoleic acid, linolenic acid, γ-linolenic acid, arachidonic acid, ricinoleic acid, α-oxylinolenic acid, obtusilic acid, linoelaidic acid, oleic acid, isovaleric acid, isobutyric acid, anteiso acid, licanic acid, gorlic acid, hydrocarbyl acid, and malvalic acid.

In consideration of suppression of damage to a lamination film, ease of cleaning after DI forming, and food safety, a straight-chain fatty acid having a carbon number of 6 to 12 is more preferable. Examples of the straight-chain fatty acid having a carbon number of 6 to 12 include caproic acid, caprylic acid, capric acid, and lauric acid. The most preferable straight-chain fatty acid is caproic acid, caprylic acid, or capric acid. One or more kinds of the fatty acids can be used.

Examples of the water (c) include tap water, ion-exchanged water, and distilled water. In consideration of solution stability of a water-based coolant, ease of cleaning after DI forming, and suppression of damage to a lamination film, ion-exchanged water is most preferable, but the water is not particularly limited to the ion-exchanged water.

In the DI forming water-based coolant, the total content of the base (a) and the fatty acid (b) is 0.02 to 4% by mass, preferably 0.04 to 3.0% by mass, more preferably 0.06 to 2.0% by mass, most preferably 0.07 to 1.5% by mass in consideration of DI formability and corrosion resistance (soundness of a film of a can inner surface). In other words, when the total content of the base (a) and the fatty acid (b) falls below 0.02% by mass, corrosion resistance (soundness of a film of a can inner surface) is insufficient. When the total content exceeds 4% by mass, DI formability (ease of stripping) is insufficient.

A neutralization reaction may be caused between the base (a) and the fatty acid (b) in the DI forming water-based coolant.

In consideration of corrosion resistance (soundness of a film of a can inner surface) and suppression of damage to a lamination film, the ratio of the straight-chain fatty acid having a carbon number of 6 to 12 in the fatty acid (b) is 80 to 100% by mass, preferably 85 to 100% by mass. In other words, when the ratio of the straight-chain fatty acid having a carbon number of 6 to 12 falls below 80% by mass, the damage to a film is significantly large and corrosion resistance (soundness of a film of a can inner surface) is insufficient.

The ratio (content) of the water (c) in the water-based coolant is preferably 80% or more by mass, more preferably 85% or more by mass, most preferably 90% or more by mass. When the ratio of the water (c) falls below 80% by mass, DI formability, ease of cleaning after DI forming, and suppression of damage to a film tend to be insufficient.

With the DI forming water-based coolant of a laminated metal sheet having the composition described above, excellent DI formability is achieved during DI forming of a laminated metal sheet. Furthermore, the DI forming water-based coolant of a laminated metal sheet has the following characteristics: (i) damage is not caused to a lamination film (particularly polyester film) of the laminated metal sheet; (ii) cleaning is easily performed and a DI can with high food safety level can be obtained even if a cleaning step of DI formed parts is simplified; and (iii) rust is not easily caused on the surface of a forming apparatus in spite of a water-based coolant.

In the DI forming water-based coolant of a laminated metal sheet, in consideration of corrosion resistance (soundness of a film of a can inner surface), rust prevention of the surface of a forming apparatus, ease of cleaning after DI forming, suppression of damage to a lamination film, and solution stability of a coolant, the molar ratio of base (a)/fatty acid (b) is preferably 0.2 to 3.0, more preferably 0.3 to 2.9, more preferably 0.4 to 2.8 while the molar ratio of alkanolamine/fatty acid (b) is preferably 0 to 3.0, more preferably 0.1 to 2.9, more preferably 0.2 to 2.8 and the molar ratio of alkali metal hydroxide/fatty acid (b) is preferably 0 to 1.8, more preferably 0.1 to 1.7, more preferably 0.2 to 1.6.

In other words, when the molar ratio of base (a)/fatty acid (b) falls below 0.2, corrosion resistance (soundness of a film of a can inner surface), suppression of damage to a film, ease of cleaning after DI forming, solution stability of a coolant, and rust prevention of the surface of a forming apparatus tend to decrease. In contrast, when the molar ratio exceeds 3.0, corrosion resistance (soundness of a film of a can inner surface) tends to decrease while damage is easily caused to a film. Furthermore, when the molar ratio of alkanolamine/fatty acid (b) exceeds 3.0 in the case where an alkanolamine is contained as part or all of the base (a) or when the molar ratio of alkali metal hydroxide/fatty acid (b) exceeds 1.8 in the case where an alkali metal hydroxide is contained as part or all of the base (a), damage is easily caused to a film.

In the DI forming water-based coolant of a laminated metal sheet, in consideration of solution stability of a coolant, corrosion resistance (soundness of a film of a can inner surface), and the like, pH at 40° C. is preferably 7.3 to 11.5, more preferably 7.3 to 11.0, more preferably 7.5 to 10.5, most preferably 7.5 to 9.5. In other words, when pH is less than 7.3, solution stability of a coolant easily decreases and corrosion resistance (soundness of a film of a can inner surface) also tends to decrease. In contrast, when pH is more than 11.5, corrosion resistance (soundness of a film of a can inner surface) tends to decrease.

The DI forming water-based coolant of a laminated metal sheet is required to contain the base (a), the fatty acid (b), and the water (c), but other additional components can be added thereto to improve the effects regarding DI formability, solution stability of a coolant, rust prevention of the surface of a forming apparatus, suppression of damage to a lamination film, ease of cleaning after DI forming, food safety, and the like. Examples of the other additional components include surfactants, cleaning agents, dispersants, preservatives, antifoaming agents, and sequestering agents. One or more kinds of these additional components may be suitably blended.

Although the content of the additional components other than the base (a), the fatty acid (b), and the water (c) is not limited, the content is preferably 16% or less by mass in consideration of the preferable content of the water (c). Moreover, the content is preferably 6% or less by mass in consideration of solution stability of a coolant.

Nonionic surfactants, anionic surfactants, cationic surfactants, or amphoteric surfactants can be used as the surfactants. Among these, nonionic surfactants are particularly preferred. Examples of the nonionic surfactants include polyoxyethylene ether surfactants such as polyoxyethylene alkyl ethers, block polyoxyethylene-polyoxypropylene alkyl ethers, random polyoxyethylene-polyoxypropylene alkyl ethers, block polyoxyalkylene glycols, random polyoxyalkylene glycols, block polyoxyalkylene glycol alkyldiamines, and random polyoxyalkylene glycol alkyldiamines; polyol fatty acid ester surfactants such as sorbitan fatty acid esters, fatty acid sugar esters, glycerin fatty acid esters, and pentaerythritol fatty acid esters; and polyoxyethylene ester surfactants such as polyoxyethylene fatty acid esters, sorbitan polyoxyethylene fatty acid esters, sorbitol polyoxyethylene fatty acid esters, pentaerythritol polyoxyethylene fatty acid esters, and polyoxyethylene castor oil esters. One or more kinds of these nonionic surfactants can be used.

Nonionic surfactants and anionic surfactants can be used by combining them. Publicly known cationic surfactants and amphoteric surfactants can also be used.

In consideration of food safety, examples of more preferable nonionic surfactants include polyoxyethylene ether surfactants such as polyoxyethylene alkyl ethers, block polyoxyethylene-polyoxypropylene alkyl ethers, random polyoxyethylene-polyoxypropylene alkyl ethers, block polyoxyalkylene glycols, random polyoxyalkylene glycols, block polyoxyalkylene glycol alkyldiamines, and random polyoxyalkylene glycol alkyldiamines; polyol fatty acid ester surfactants such as sorbitan fatty acid esters, fatty acid sugar esters, glycerin fatty acid esters, and pentaerythritol fatty acid esters; and polyoxyethylene ester surfactants such as polyoxyethylene fatty acid esters, sorbitan polyoxyethylene fatty acid esters, sorbitol polyoxyethylene fatty acid esters, and polyoxyethylene castor oil esters.

In consideration of food safety, examples of the cleaning agents include alkali metal or alkaline-earth metal sulfonates, alkali metal or alkaline-earth metal salicylates, alkali metal or alkaline-earth metal phenates, and fatty acid soaps. One or more kinds of these cleaning agents can be used.

Phenol preservatives, triazine preservatives, isothiazoline preservatives, or the like are exemplified as the preservatives. Examples of the phenol preservatives include o-phenylphenol, Na-o-phenylphenol, and 2,3,4,6-tetrachlorophenol. Examples of the triazine preservatives include hexahydro-1,3,5-tris(2-hydroxyethyl)-1,3,5-triazine. Examples of the isothiazoline preservatives include 1,2-benzisothiazolin-3-one, 5-chloro-2-methyl-4-isothiazolin-3-one, and 2-methyl-isothiazolin-3-one. One or more kinds of these preservatives can be used.

In consideration of food safety, examples of more preferable preservatives include o-phenylphenol, Na-o-phenylphenol, hexahydro-1,3,5-tris(2-hydroxyethyl)-1,3,5-triazine, 1,2-benzisothiazolin-3-one, 5-chloro-2-methyl-4-isothiazolin-3-one, and 2-methyl-isothiazolin-3-one.

In consideration of food safety, examples of the antifoaming agents include silicone emulsions, higher alcohols, metallic soaps, and ethylene-propylene copolymers. One or more kinds of these antifoaming agents can be used.

In a method for DI forming a laminated metal sheet, a laminated metal sheet is DI-formed using the water-based coolant described above. In a method for manufacturing a laminated DI-formed body such as a DI can is manufactured by DI-forming a laminated metal sheet using the water-based coolant described above.

For the method for DI forming a laminated metal sheet and the method for manufacturing a laminated DI-formed body, the preferable conditions or the like will be described hereinafter.

For example, a steel sheet, an aluminum sheet, or an aluminum alloy sheet can be used as a material of the laminated metal sheet, and an inexpensive steel sheet is preferred in consideration of cost efficiency. For example, a chromium steel sheet or a tinned steel sheet can be used as a base steel sheet to be laminated. The chromium steel sheet (tin-free steel) preferably has a metal chromium layer (upper layer) with a coating weight of 50 to 200 $mg/m^2$ and a chromium oxide layer (lower layer) with a coating weight of 3 to 30 $mg/m^2$ on a metal chromium basis on its surface. The tinned steel sheet preferably has a coating weight of 0.5 to 15 $g/m^2$. Although the thickness of the steel sheet is not specifically limited, for example, a steel sheet having a thickness of 0.15 to 0.30 mm can be suitably used.

A resin film (lamination film) constituting the laminated metal sheet is preferably composed of a polyester resin film. The water-based coolant is particularly useful when a laminated metal sheet including such a resin film is DI formed.

The polyester resin film is inexpensive and has good mechanical strength; good lubricity due to its low friction coefficient; and a good shielding effect on a gas or a liquid, that is, a good barrier property. Thus, the polyester resin film can withstand forming with a high working ratio such as DI forming in which an elongation percentage reaches 300%, and the film is sound after the forming.

The polyester resin includes a dicarboxylic acid component mainly composed of terephthalic acid and a diol component mainly composed of ethylene glycol. In consideration of the balance between processability and strength of the polyester resin film, 8 to 20 mol % of an isophthalic acid component is preferably contained as a copolymer component. The crystallization temperature is preferably 120 to 160° C.

When the ratio of the copolymer component is low, molecules are easily oriented. In addition, when the working ratio becomes high, the film tends to be peeled off or a crack (breakage) in a direction parallel to the height direction of a can tends to appear. When a heat treatment is conducted on a processed can body, molecules are also easily oriented. To make it difficult for molecules to be oriented, the higher the ratio of the copolymer component, the better. However, when the ratio exceeds 20 mol %, the cost efficiency decreases due to expensive film cost. Furthermore, scratch resistance and chemical resistance may decrease because the film becomes soft.

Since a film resin is extremely easily crystallized if its crystallization temperature is less than 120° C., a crack or a pin hole may appear in the film resin during processing with a high working ratio. In contrast, since the crystallization kinetic is extremely slow if its crystallization temperature is more than 160° C., the film resin is not sufficiently crystallized even in a heat treatment of 150° C. or more and the strength and durability of the film may be impaired.

Moreover, additives such as a pigment, a lubricant, and a stabilizer may be added to the resin film. Another resin film having a different function may be disposed between the resin film and the upper layer or between the resin film and the base steel sheet to provide two or more layers of resin films. A resin film having a thickness of 5 to 50 μm can be suitably used.

The laminated metal sheet normally has resin films such as the polyester resin film described above on both faces thereof. A method for laminating the resin to the metal sheet is not particularly limited. Thermocompression bonding of a biaxially stretched film or an unstretched film or extrusion in which a resin film is directly formed on a metal sheet using a T-die can be suitably selected. Furthermore, the polyester resin film can be bonded to the base metal sheet using, for example, a polyesterurethane adhesive or a saturated polyester adhesive. Although it has been confirmed that all of the methods provide a sufficient effect, the thermocompression bonding in particular is advantageous in consideration of good adhesion to the base metal sheet and cost efficiency because an adhesive is unnecessary.

In the DI forming of a laminated metal sheet, a commercially available cupping press and DI press apparatus can be used, and there is no difference made by their specifications. The DI forming water-based coolant of a laminated metal sheet can be suitably used for particularly ironing (and redrawing) with the DI press apparatus. The coolant circulates through the apparatus to perform cooling during forming.

The application of wax to the surface of a laminated metal sheet is preferred as lubrication during drawing with the cupping press. When 10 to 500 $mg/m^2$ of paraffin wax or fatty acid ester wax having a melting point of 30 to 80° C. is applied, good formability is provided.

The formed body obtained by forming with the DI press apparatus is cleaned or not cleaned and then heat-treated to be dried and improve adhesion of a film. The temperature in the heat treatment is preferably 200° C. or more. By drying the formed body at a temperature of 200° C. or more, almost all components in the coolant disappear. As a result, a highly safe laminated formed body (e.g., laminated DI can) is obtained. To prevent the degradation of the durability of a film, the temperature in the heat treatment is preferably less than or equal to the melting point of the resin film. In the case where cleaning is conducted after DI forming, cleaning with water is sufficient.

EXAMPLE

A chromium steel sheet with a thickness of 0.20 mm and a temper degree of T3 (metal chromium layer: 120 $mg/m^2$, chromium oxide layer: 10 mg/m² on a metal chromium basis) was prepared as a base steel sheet. A 10% isophthalic acid copolymerized polyethylene terephthalate film having a thickness of 25 μm and made by biaxial stretching was pressure-bonded to both faces of the base steel sheet that was heated to 240° C. using a nip roll, cooled with water within one second, and then dried to make a laminated steel sheet to be a laminated DI can.

A laminated DI can was manufactured by DI forming the thus-obtained laminated steel sheet under the conditions described below. In the redrawing and ironing, water-based coolants shown in Tables 1 to 3 were used. In this DI forming, 50 mg/m² of paraffin wax with a melting point of 45° C. was applied to both faces of the laminated steel sheet. Subsequently, a blank with 123 mmφ was punched and the blank was drawn into a cup having an inner diameter of 71 mmφ and a height of 36 mm using a commercially available cupping press. The cup was then inserted into a commercially available DI press apparatus. Redrawing and three-staged ironing (respective reductions are 20%, 19%, and 23%) were conducted with a punch speed of 200 mm/s and a stroke of 560 mm. At the end, a laminated DI can having an inner diameter of 52 mm and a height of 90 mm was formed. In this DI forming, the water-based coolants were circulated at 50° C. Tap water was used as water contained in the water-based coolants.

For the used water-based coolants, solution stability was evaluated by the method described below. In addition, ease of stripping during DI forming, corrosion resistance (soundness of a film of a can inner surface) of a manufactured laminated DI can, damage to a film, and eating quality were evaluated with performance tests described below. For the evaluation of DI formability and corrosion resistance after DI forming, the tests were conducted after ion-exchanged water with a temperature of 50° C. was sprayed to the obtained laminated DI can for two minutes to clean the surface thereof and then dried in a drying furnace at 210° C. for 30 seconds. The evaluation results are shown in Tables 1 to 3 together with the composition and physical properties of the used water-based coolants.

(1) Solution Stability of Coolant

A solution condition after a coolant was held at 40° C. for one hour was visually observed to evaluate solution stability. Evaluation criteria of the solution condition were Good: transparent, Fair: translucent, and Poor: opaque.

(2): Ease of Stripping

A phenomenon in which, when a punch was pulled out from the formed can body during DI forming, an opening edge of the can body was caught by a stripper so that the opening edge was distorted was evaluated as follows.

Poor: Distortion that appears at the opening edge reaches a trimming portion.

Fair: Distortion appears at the opening edge, but the distortion does not reach a trimming portion.

Good: Distortion appears at the opening edge, but the distortion reaches only the border of the opening edge.

Excellent: There is no distortion at the opening edge.

(3) Corrosion Resistance (Soundness of a Film of a can Inner Surface)

Corrosion resistance was evaluated with the soundness of a film of a can inner surface (a film having fewer defects is better). After the mouth of a cleaned and dried laminated DI can was scratched using a file such that an electric current can be applied to its base steel sheet, the can was filled with an electrolyte solution (1% NaCl solution, 25° C.) to the mouth of the can. Subsequently, a voltage of 6.2 V was applied between the can body and the electrolyte solution. The evaluation was performed on the basis of the measured current value as described below.

Poor: more than 1 mA
Fair: more than 0.1 mA and 1 mA or less
Good: more than 0.01 mA and 0.1 mA or less
Excellent: 0.01 mA or less (4) Damage to Film The damage caused by coolants was evaluated for a formed film of a can inner surface. A cleaned and dried laminated DI can was filled with coolants having each composition and a lid was then seamed to the can. Retort treatment (125° C., 90 minutes) was conducted on the can and the lid was then opened. After the mouth of the can was scratched using a file such that an electric current can be applied to its base steel sheet, the can was filled with an electrolytic solution (1% NaCl solution, 25° C.) to the mouth of the can. Subsequently, a voltage of 6.2 V was applied between the can body and the electrolytic solution. The evaluation was performed on the basis of the measured current value as described below.

Poor: more than 5 mA
Fair: more than 0.5 mA and 5 mA or less
Good: more than 0.05 mA and 0.5 mA or less
Excellent: 0.05 mA or less (5) Eating Quality The presence or absence of coolant components left on a can inner surface after heat treatment was evaluated with a sensory test. After flanging was conducted on a heat-treated laminated DI can, the can was filled with pure water to the mouth of the can. The lid was then seamed to the can and retort treatment (125° C., 90 minutes) was conducted. Five testers conducted the sensory test on the water in the can after the retort treatment and evaluated as follows.

Poor: Two or more testers out of five sense a nasty smell or a taste difference.

Good: One or none of the testers out of five senses a nasty smell or a taste difference.

TABLE 1

| | Coolant | | | | | | |
|---|---|---|---|---|---|---|---|
| | Composition | | | | | | |
| | Base (a) | | Fatty acid (b) | | | | Water (c) |
| No. | Kind | Content (% by mass) | Kind *1 | Content (% by mass) | (a) + (b) (% by mass) | (a)/(b) molar ratio | Content (% by mass) |
| 1 | triethanolamine | 0.38 | caprylic acid (C8) | 0.16 | 0.54 | 2.38 | 99.46 |
| 2 | triethanolamine | 0.38 | capric acid (C10) | 0.19 | 0.57 | 2.38 | 99.43 |
| 3 | triethanolamine | 1.90 | caproic acid (C6) | 0.50 | 2.40 | 2.95 | 97.60 |
| 4 | triethanolamine | 0.38 | lauric acid (C12) | 0.22 | 0.60 | 2.33 | 99.40 |
| 5 | triethanolamine | 1.36 | caprylic acid (C8) | 0.47 | 1.83 | 2.79 | 98.17 |

TABLE 1-continued

| No. | Base | Content (% by mass) | Fatty acid | Content (% by mass) | (a)+(b) (% by mass) | (a)/(b) (molar ratio) | Water (% by mass) |
|---|---|---|---|---|---|---|---|
| 6 | triethanolamine | 0.02 | capric acid (C10) | 0.03 | 0.05 | 0.97 | 99.95 |
| 7 | triethanolamine | 2.40 | lauric acid (C12) | 1.10 | 3.50 | 2.93 | 96.50 |
| 8 | triethanolamine | 0.01 | caproic acid (C6) | 0.01 | 0.02 | 0.92 | 99.98 |
| 9 | triethanolamine | 0.04 | caprylic acid (C8) | 0.04 | 0.08 | 0.92 | 99.92 |
| 10 | sodium hydroxide | 0.01 | capric acid (C10) | 0.05 | 0.06 | 0.85 | 99.94 |
| 11 | sodium hydroxide | 0.01 | caprylic acid (C8) | 0.04 | 0.05 | 0.82 | 99.95 |
| 12 | monoethanolamine | 0.17 | capric acid (C10) | 0.20 | 0.37 | 2.40 | 99.63 |
| 13 | monoethanolamine | 0.21 | caprylic acid (C8) | 0.17 | 0.38 | 2.97 | 99.62 |
| 14 | potassium hydroxide | 0.06 | caprylic acid (C8) | 0.18 | 0.24 | 0.87 | 99.76 |
| 15 | potassium hydroxide | 0.06 | capric acid (C10) | 0.21 | 0.27 | 0.88 | 99.73 |
| 16 | potassium hydroxide | 0.08 | caprylic acid (C8) | 0.20 | 0.28 | 1.02 | 99.72 |
| 17 | potassium hydroxide | 0.005 | caproic acid (C6) | 0.02 | 0.025 | 0.47 | 99.975 |
| 18 | potassium hydroxide | 0.96 | lauric acid (C12) | 2.80 | 3.76 | 1.05 | 96.24 |
| 19 | potassium hydroxide | 0.004 | caproic acid (C6) | 0.02 | 0.024 | 0.41 | 99.976 |
| 20 | triethanolamine | 0.38 | undecanoic acid (C11) | 0.21 | 0.59 | 2.26 | 99.41 |

| No. | Other additional Components Component | Content (% by mass) | pH (40° C.) | Solution stability (40° C.) | Ease of stripping | Corrosion resistance | Damage to film | Eating quality | Section |
|---|---|---|---|---|---|---|---|---|---|
| 1 | — | — | 8.5 | Good | Excellent | Excellent | Excellent | Good | Invention Example |
| 2 | — | — | 8.6 | Good | Excellent | Excellent | Excellent | Good | Invention Example |
| 3 | — | — | 8.9 | Good | Excellent | Excellent | Excellent | Good | Invention Example |
| 4 | — | — | 8.4 | Good | Excellent | Excellent | Excellent | Good | Invention Example |
| 5 | — | — | 8.8 | Good | Excellent | Excellent | Excellent | Good | Invention Example |
| 6 | — | — | 7.6 | Good | Excellent | Excellent | Excellent | Good | Invention Example |
| 7 | — | — | 8.8 | Good | Excellent | Excellent | Excellent | Good | Invention Example |
| 8 | — | — | 7.5 | Good | Excellent | Excellent | Excellent | Good | Invention Example |
| 9 | — | — | 7.4 | Good | Excellent | Excellent | Excellent | Good | Invention Example |
| 10 | — | — | 11.2 | Good | Excellent | Excellent | Excellent | Good | Invention Example |
| 11 | — | — | 11.1 | Good | Excellent | Excellent | Excellent | Good | Invention Example |
| 12 | — | — | 10.3 | Good | Excellent | Excellent | Excellent | Good | Invention Example |
| 13 | — | — | 10.8 | Good | Excellent | Excellent | Excellent | Good | Invention Example |
| 14 | — | — | 7.6 | Good | Excellent | Excellent | Excellent | Good | Invention Example |
| 15 | — | — | 7.9 | Good | Excellent | Excellent | Excellent | Good | Invention Example |
| 16 | — | — | 11.3 | Good | Excellent | Excellent | Excellent | Good | Invention Example |
| 17 | — | — | 7.7 | Good | Excellent | Excellent | Excellent | Good | Invention Example |
| 18 | — | — | 11.4 | Good | Excellent | Excellent | Excellent | Good | Invention Example |
| 19 | — | — | 7.4 | Good | Excellent | Excellent | Excellent | Good | Invention Example |
| 20 | — | — | 8.2 | Good | Excellent | Excellent | Excellent | Good | Invention Example |

*1 The number in parentheses is the number of carbon atoms.

TABLE 2

| No. | Base (a) Kind | Content (% by mass) | Fatty acid (b) Kind *1 | Content (% by mass) | (a)+(b) (% by mass) | (a)/(b) (molar ratio) | Water (c) Content (% by mass) | Other additional components Component | Content (% by mass) |
|---|---|---|---|---|---|---|---|---|---|
| 21 | triethanolamine | 0.48 | enanthic acid (C7) | 0.18 | 0.66 | 2.33 | 99.34 | — | — |
| 22 | potassium | 0.20 | enanthic acid (C7) | 0.55 | 0.75 | 0.84 | 99.25 | — | — |
| 23 | triethanolamine | 0.38 | caprylic acid (C8) + capric acid (C10) *4 | 0.17 | 0.55 | 2.38 | 99.45 | — | — |
| 24 | triethanolamine | 0.027 | caprylic acid (C8) | 0.035 | 0.062 | 0.75 | 99.938 | — | — |
| 25 | triethanolamine | 0.22 | capric acid (C10) | 0.45 | 0.67 | 0.56 | 99.33 | — | — |
| 26 | monoethanolamine | 0.05 | capric acid (C10) | 0.04 | 0.09 | 4.10 | 99.91 | — | — |
| 27 | potassium hydroxide | 0.07 | capric acid (C10) | 0.19 | 0.26 | 1.13 | 99.74 | — | — |
| 28 | potassium hydroxide | 0.08 | caprylic acid (C8) | 0.58 | 0.66 | 0.35 | 99.34 | — | — |
| 29 | triethanolamine | 0.38 | caprylic acid (C8) | 0.16 | 0.54 | 2.38 | 99.16 | polyoxyalkylene glycol *2 | 0.30 |
| 30 | triethanolamine | 0.38 | capric acid (C10) | 0.19 | 0.57 | 2.38 | 99.13 | polyoxyalkylene glycol *3 | 0.30 |
| 31 | triethanolamine | 0.39 | fatty acid A *5 | 0.15 | 0.54 | 2.42 | 99.46 | — | — |
| 32 | triethanolamine | 0.392 | fatty acid B *6 | 0.186 | 0.578 | 2.39 | 99.422 | — | — |

TABLE 2-continued

| | | | | | | | | |
|---|---|---|---|---|---|---|---|---|
| 33 | potassium hydroxide | 0.06 | fatty acid B *6 | 0.22 | 0.28 | 0.90 | 99.72 | — | — |
| 34 | base A *7 | 0.037 | caprylic acid (C8) | 0.11 | 0.147 | 0.85 | 99.853 | — | — |
| 35 | base B *8 | 0.435 | capric acid (C10) | 0.21 | 0.645 | 2.41 | 99.355 | — | — |

| | Coolant | | | | | |
|---|---|---|---|---|---|---|
| | Physical Properties | | Can manufacturing evaluation | | | |
| No. | pH (40° C.) | Solution stability (40° C.) | Ease of stripping | Corrosion resistance | Damage to film | Eating quality | Section |
|---|---|---|---|---|---|---|---|
| 21 | 8.3 | Good | Excellent | Excellent | Excellent | Good | Invention Example |
| 22 | 7.8 | Good | Excellent | Excellent | Excellent | Good | Invention Example |
| 23 | 8.5 | Good | Excellent | Excellent | Excellent | Good | Invention Example |
| 24 | 7.6 | Good | Excellent | Excellent | Excellent | Good | Invention Example |
| 25 | 6.2 | Fair | Excellent | Good | Excellent | Good | Invention Example |
| 26 | 14.0 | Good | Excellent | Good | Good | Good | Invention Example |
| 27 | 13.5 | Good | Excellent | Good | Excellent | Good | Invention Example |
| 28 | 6.1 | Fair | Excellent | Good | Excellent | Good | Invention Example |
| 29 | 8.3 | Good | Excellent | Excellent | Excellent | Good | Invention Example |
| 30 | 8.5 | Good | Excellent | Excellent | Excellent | Good | Invention Example |
| 31 | 8.7 | Good | Excellent | Excellent | Excellent | Good | Invention Example |
| 32 | 8.6 | Good | Excellent | Excellent | Excellent | Good | Invention Example |
| 33 | 8.0 | Good | Excellent | Excellent | Excellent | Good | Invention Example |
| 34 | 7.8 | Good | Excellent | Excellent | Excellent | Good | Invention Example |
| 35 | 8.6 | Good | Excellent | Excellent | Excellent | Good | Invention Example |

*1 The number in parentheses is the number of carbon atoms.
*2 "Pluronic PE 6400" available from BASF Japan
*3 "Pluronic PE 4300" available from BASF Japan
*4 Mixing ratio (by mass) = 1:1
*5 "LUNAC 8-98" available from Kao Corporation ( = caprylic acid (C8): 98% or more by mass)
*6 "LUNAC 10-98" available from Kao Corporation ( = capric acid (C10): 98% or more by mass)
*7 triethanolamine: 1% by mass + potassium hydroxide: 99% by mass
*8 triethanolamine: 99% by mass + potassium hydroxide: 1% by mass

TABLE 3

| | Coolant | | | | | | | |
|---|---|---|---|---|---|---|---|---|
| | Composition | | | | | | | |
| | Base (a) | | Fatty acid (b) | | | | Water (c) | Other additional components | |
| No. | Kind | Content (% by mass) | Kind *1 | Content (% by mass) | (a) + (b) (% by mass) | (a)/(b) (molar ratio) | Content (% by mass) | Component | Content (% by mass) |
|---|---|---|---|---|---|---|---|---|---|
| 36 | triethanolamine | 0.057 | fatty acid D *13 | 0.0245 | 0.0815 | 2.41 | 99.9185 | — | — |
| 37 | potassium | 0.12 | fatty acid D *13 | 0.37 | 0.49 | 0.86 | 99.51 | — | — |
| 38 | base C *10 | 0.025 | caprylic acid (C8) | 0.026 | 0.051 | 1.36 | 99.949 | — | — |
| 39 | base D *11 | 0.029 | caprylic acid (C8) | 0.026 | 0.055 | 2.17 | 99.945 | — | — |
| 40 | base E *12 | 0.011 | caprylic acid (C8) | 0.026 | 0.037 | 0.42 | 99.963 | — | — |
| 41 | triethanolamine | 0.45 | caprylic acid (C8) | 0.14 | 0.59 | 3.11 | 99.41 | — | — |
| 42 | monoethanolamine | 0.16 | capric acid (C10) | 0.15 | 0.31 | 3.06 | 99.69 | — | — |
| 43 | base B *8 | 0.24 | capric acid (C10) | 0.08 | 0.32 | 3.48 | 99.68 | — | — |
| 44 | triethanolamine | 3.84 | oleic acid (C18) | 3.03 | 6.87 | 2.40 | 93.13 | — | — |
| 45 | potassium | 0.03 | oleic acid (C18) | 0.35 | 0.38 | 0.43 | 99.62 | — | — |
| 46 | triethanolamine | 0.38 | butyric acid (C4) | 0.09 | 0.47 | 2.49 | 99.53 | — | — |
| 47 | triethanolamine | 0.0009 | caprylic acid (C8) | 0.0008 | 0.0017 | 1.09 | 99.9983 | — | — |

TABLE 3-continued

| | | | | | | | | | |
|---|---|---|---|---|---|---|---|---|---|
| 48 | triethanolamine | 4.70 | capric acid (C10) | 2.10 | 6.80 | 2.58 | 93.20 | — | — |
| 49 | potassium | 0.0003 | caprylic acid (C8) | 0.0009 | 0.0012 | 0.86 | 99.9988 | — | — |
| 50 | triethanolamine | 0.33 | oleic acid (C18) | 0.25 | 0.58 | 2.50 | 99.42 | — | — |
| 51 | triethanolamine | 0.21 | fatty acid C *9 | 0.12 | 0.33 | 2.45 | 99.67 | — | — |
| 52 | sodium | 0.049 | fatty acid C *9 | 0.21 | 0.259 | 0.88 | 99.741 | — | — |
| 53 | triethanolamine | 0.20 | fatty acid E *14 | 0.10 | 0.30 | 2.42 | 99.70 | — | — |
| 54 | potassium | 0.0038 | fatty acid E *14 | 0.01 | 0.0138 | 1.24 | 99.9862 | — | — |

| | Coolant Physical properties | | Can manufacturing evaluation | | | | |
|---|---|---|---|---|---|---|---|
| No. | pH (40° C.) | Solution stability (40° C.) | Ease of stripping | Corrosion resistance | Damage to film | Eating quality | Section |
| 36 | 8.5 | Good | Excellent | Excellent | Excellent | Good | Invention Example |
| 37 | 7.6 | Good | Excellent | Excellent | Excellent | Good | Invention Example |
| 38 | 12.6 | Good | Excellent | Good | Good | Good | Invention Example |
| 39 | 9.7 | Good | Excellent | Excellent | Excellent | Good | Invention Example |
| 40 | 8.4 | Good | Excellent | Excellent | Excellent | Good | Invention Example |
| 41 | 9.1 | Good | Excellent | Excellent | Good | Good | Invention Example |
| 42 | 11.2 | Good | Excellent | Good | Good | Good | Invention Example |
| 43 | 9.3 | Good | Excellent | Excellent | Good | Good | Invention Example |
| 44 | 8.2 | Good | Poor | Good | Poor | Good | Comparative Example |
| 45 | 7.0 | Poor | Excellent | Poor | Poor | Good | Comparative Example |
| 46 | 8.8 | Good | Excellent | Poor | Good | Good | Comparative Example |
| 47 | 8.1 | Good | Excellent | Poor | Good | Good | Comparative Example |
| 48 | 8.6 | Good | Poor | Excellent | Excellent | Good | Comparative Example |
| 49 | 8.2 | Good | Excellent | Poor | Good | Good | Comparative Example |
| 50 | 8.4 | Good | Excellent | Poor | Poor | Good | Comparative Example |
| 51 | 8.8 | Good | Excellent | Poor | Poor | Good | Comparative Example |
| 52 | 8.0 | Good | Excellent | Poor | Poor | Good | Comparative Example |
| 53 | 8.6 | Good | Excellent | Poor | Poor | Good | Comparative Example |
| 54 | 12.3 | Good | Excellent | Poor | Poor | Good | Comparative Example |

*1 The number in parentheses is the number of carbon atoms.
*8 triethanolamine: 99% by mass + potassium hydroxide: 1% by mass
*9 capric acid (C10): 50% by mass + linoleic acid (C18): 50% by mass
*10 triethanolamine: 50% by mass + potassium hydroxide: 50% by mass
*11 triethanolamine: 20% by mass + potassium hydroxide: 80% by mass
*12 triethanolamine: 95% by mass + potassium hydroxide: 5% by mass
*13 "LUNAC 8-98" available from Kao Corporation ( = caprylic acid (C8): 98% or more by mass): 90% by mass + oleic acid (C18): 10% by mass
*14 "LUNAC 8-98" available from Kao Corporation ( = caprylic acid (C8): 98% or more by mass): 70% by mass + linoleic acid (C18): 30% by mass According to Tables 1 to 3, when the water-based coolants No. 1 to 43 of Invention Example were used, good results were obtained for all the DI formability (ease of stripping and corrosion resistance), the damage to a film, and the eating quality. In contrast, when the water-based coolants No. 44 to 54 of Comparative Example were used, at least one of the DI form ability (ease of stripping and corrosion resistance), the damage to a film, and the eating quality was insufficient.

When the water-based coolants of Invention Example were used, an effect of rust prevention was produced on the surface of a steel material of a DI forming apparatus. Furthermore, problems such as rusting did not arise even in a long-term use or a long-term contact of the coolants.

INDUSTRIAL APPLICABILITY

A DI forming water-based coolant of a laminated metal sheet achieves excellent DI formability during DI forming of a laminated metal sheet and has the following characteristics: (i) damage is not caused to a lamination film (particularly polyester film) of the laminated metal sheet; (ii) cleaning is easily performed and a DI can with high food safety level can be obtained even if a cleaning step of DI formed parts is simplified; and (iii) rust is not easily caused on the surface of a forming apparatus in spite of a water-based coolant. Accordingly, in a method for DI forming a laminated metal sheet and a method for manufacturing a laminated DI-formed body that use the water-based coolant described above, a laminated metal sheet can be suitably DI formed to obtain a laminated DI-formed body (e.g., laminated DI can) with good quality, food safety, and durability. Since a cleaning step after forming is simplified, productivity is significantly improved. Thus, the coolant and method has significantly high industrial applicability.

The invention claimed is:

1. A DI forming water-based coolant of a laminated metal sheet comprising:
    at least one base (a) selected from the group consisting of ethanolamines and alkali metal hydroxides;
    a fatty acid component (b) consisting of at least one straight chain aliphatic monocarboxylic acid having a carbon number of 6 to 12; and
    water (c),
wherein a total content of the base (a) and the fatty acid component (b) is about 0.02 to about 4% by mass, the pH at 40° C. is 7.3 to 11.5, and a molar ratio of base (a)/fatty acid components (6) is 0.42 to 4.1.

2. The coolant according to claim 1, wherein a molar ratio of base (a)/fatty acid component (b) is 0.2 to 3.0 while a molar ratio of ethanolamine/fatty acid component (b) is 0 to 3.0 and a molar ratio of alkali metal hydroxide/fatty acid component (b) is 0 to 1.8.

3. The coolant according to claim 1, wherein the fatty acid component (b) is at least one kind selected from the group consisting of caproic acid, caprylic acid, capric acid, and lauric acid.

4. The coolant according to claim 1, wherein an ethanolamine is contained as at least part of the base (a), and the ethanolamine is at least one kind selected from the group consisting of monoethanolamine and triethanolamine.

5. The coolant according to claim 1, wherein an alkali metal hydroxide is contained as at least part of the base (a), and the alkali metal hydroxide is at least one kind selected from the group consisting of sodium hydroxide and potassium hydroxide.

6. The coolant according to claim 2, wherein the fatty acid component (b) is at least one kind selected from the group consisting of caproic acid, caprylic acid, capric acid, and lauric acid.

7. The coolant according to claim 4, wherein the fatty acid component (b) is at least one kind selected from the group consisting of caproic acid, caprylic acid, capric acid, and lauric acid.

8. The coolant according to claim 2, wherein an ethanolamine is contained as at least part of the base (a), and the ethanolamine is at least one kind selected from the group consisting of monoethanolamine and triethanolamine.

9. The coolant according to claim 5, wherein an ethanolamine is contained as at least part of the base (a), and the ethanolamine is at least one kind selected from the group consisting of monoethanolamine and triethanolamine.

10. The coolant according to claim 3, wherein an ethanolamine is contained as at least part of the base (a), and the ethanolamine is at least one kind selected from the group consisting of monoethanolamine and triethanolamine.

11. The coolant according to claim 2, wherein an alkali metal hydroxide is contained as at least part of the base (a), and the alkali metal hydroxide is at least one kind selected from the group consisting of sodium hydroxide and potassium hydroxide.

12. The coolant according to claim 3, wherein an alkali metal hydroxide is contained as at least part of the base (a), and the alkali metal hydroxide is at least one kind selected from the group consisting of sodium hydroxide and potassium hydroxide.

13. The coolant according to claim 4, wherein an alkali metal hydroxide is contained as at least part of the base (a), and the alkali metal hydroxide is at least one kind selected from the group consisting of sodium hydroxide and potassium hydroxide.

14. A DI forming water-based coolant of a laminated metal sheet consisting of:
   at least one base (a) selected from the group consisting of ethanolamines and alkali metal hydroxides;
   a fatty acid component (b) consisting of at least one straight-chain aliphatic monocarboxylic acid having a carbon number of 6 to 12;
   water (c); and
   optionally at least one additive (d) selected from the group consisting of surfactants, cleaning agents, dispersants, preservatives, anti-foaming agents and sequestering agents,
   wherein a total content of the base (a) and the fatty acid component (b) is about 0.02 to about 4% by mass, the pH at 40° C. is 7.3 to 11.5, and a molar ratio of base (a)/fatty acid components (6) is 0.42 to 4.1.

15. The coolant according to claim 14, wherein a molar ratio of base (a)/fatty acid component (b) is 0.2 to 3.0 while a molar ratio of ethanolamine/fatty acid component (b) is 0 to 3.0 and a molar ratio of alkali metal hydroxide/fatty acid component (b) is 0 to 1.8.

16. The coolant according to claim 14, wherein the fatty acid component (b) is at least one kind selected from the group consisting of caproic acid, caprylic acid, capric acid, and lauric acid.

17. The coolant according to claim 15, wherein the fatty acid component (b) is at least one kind selected from the group consisting of caproic acid, caprylic acid, capric acid, and lauric acid.

18. The coolant according to claim 16, wherein the fatty acid component (b) is at least one kind selected from the group consisting of caproic acid, caprylic acid, capric acid, and lauric acid.

* * * * *